(12) United States Patent
Hahn

(10) Patent No.: US 11,438,745 B2
(45) Date of Patent: Sep. 6, 2022

(54) HOUSEHOLD APPLIANCE PROVISIONING

(71) Applicant: Haier US Appliance Solutions, Inc., Wilmington, DE (US)

(72) Inventor: Janghwan Hahn, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 259 days.

(21) Appl. No.: 16/911,534

(22) Filed: Jun. 25, 2020

(65) Prior Publication Data

US 2021/0409918 A1 Dec. 30, 2021

(51) Int. Cl.
| | |
|---|---|
| *H04W 4/50* | (2018.01) |
| *H04W 12/00* | (2021.01) |
| *H04W 76/14* | (2018.01) |
| *G06F 21/60* | (2013.01) |
| *H04W 8/00* | (2009.01) |
| *G06Q 30/00* | (2012.01) |
| *H04W 12/50* | (2021.01) |

(52) U.S. Cl.
CPC ............ *H04W 4/50* (2018.02); *G06F 21/606* (2013.01); *G06Q 30/01* (2013.01); *H04W 8/005* (2013.01); *H04W 12/50* (2021.01); *H04W 76/14* (2018.02)

(58) Field of Classification Search
None
See application file for complete search history.

(56) References Cited

U.S. PATENT DOCUMENTS

| | | | | |
|---|---|---|---|---|
| 2004/0203592 | A1* | 10/2004 | Kermode | H04K 1/00 455/575.1 |
| 2007/0106898 | A1* | 5/2007 | Mizutani | H04W 12/04 380/278 |
| 2014/0059352 | A1* | 2/2014 | Haga | G05B 15/02 713/171 |
| 2014/0115341 | A1* | 4/2014 | Robertson | G06F 21/30 713/183 |
| 2015/0180976 | A1* | 6/2015 | Xiao | H04L 67/22 709/203 |
| 2015/0236913 | A1* | 8/2015 | Nakano | H04L 41/0893 709/223 |
| 2016/0234213 | A1* | 8/2016 | Kim | H04L 9/3226 |

(Continued)

FOREIGN PATENT DOCUMENTS

CN 104767768 A 7/2015

*Primary Examiner* — Duc T Duong
(74) *Attorney, Agent, or Firm* — Dority & Manning, P.A.

(57) ABSTRACT

Methods of provisioning a new household appliance using an existing household appliance are provided. The existing household appliance is connected to a wireless network and provisioned to a user account. A request to add the new household appliance is received by the existing household appliance. The new household appliance searches and/or scans for the existing household appliance. A direct connection is established by and between the existing household appliance and the new household appliance. Network credentials for the wireless network and a provisioning token for the user account are securely transmitted from the existing household appliance to the new household appliance over the direct connection. The new household appliance connects to the wireless network using the securely transmitted network credentials and associates with the user account using the securely transmitted provisioning token.

19 Claims, 7 Drawing Sheets

(56) References Cited

U.S. PATENT DOCUMENTS

| | | | |
|---|---|---|---|
| 2016/0373270 A1* | 12/2016 | Yang | G01S 17/36 |
| 2016/0378082 A1 | 12/2016 | Fisher | |
| 2018/0084403 A1* | 3/2018 | Kode | H04W 12/04 |
| 2018/0159958 A1 | 6/2018 | Farmer | |
| 2020/0402044 A1* | 12/2020 | Vyas | G06Q 20/3672 |
| 2021/0044968 A1* | 2/2021 | Robert | H04L 63/0861 |
| 2021/0176057 A1* | 6/2021 | Sangle-Ferriere | H04L 9/3242 |
| 2021/0398551 A1* | 12/2021 | Nandy | G10L 15/16 |
| 2022/0046099 A1* | 2/2022 | Correa Azzolin | H04L 67/306 |
| 2022/0103390 A1* | 3/2022 | Chen | G10L 15/22 |

* cited by examiner

HOUSEHOLD APPLIANCE PROVISIONING

FIELD OF THE INVENTION

The present subject matter relates generally to household appliances which can connect to a home network and/or a remote network such as the internet. In particular, the present subject matter relates to a household appliance configured for improved provisioning of the household appliance to a user account and related methods.

BACKGROUND OF THE INVENTION

Household appliances are utilized generally for a variety of tasks by a variety of users. For example, a household may include such appliances as laundry appliances, e.g., a washer and/or dryer, kitchen appliances, e.g., a refrigerator, a microwave, and/or a coffee maker, along with room air conditioners and other various appliances.

Some household appliances can also include features for connecting to and communicating over a secure wireless network. Such communication may provide connected features on the household appliances, e.g., where the household appliance communicates with a personal device, smart home systems, and/or a remote database such as a cloud server.

Typically, such household appliances require multiple processes using multiple user interfaces in order to establish a connection or association, in particular an initial connection or association, between the household appliance and a user account.

Accordingly, there exists a need for an appliance which can be connected to a secured wireless network and added to a user account in an easier and more convenient manner.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a method of provisioning a new household appliance using an existing household appliance is provided. The existing household appliance is connected to a wireless network and provisioned to a user account. The method includes receiving, from a user interface of the existing household appliance, a request to add the new household appliance to the user account and receiving a provisioning command from a user interface of the new household appliance. The method further includes scanning for the existing household appliance with the new household appliance and establishing a direct connection from the new household appliance to the existing household appliance. The method also includes obtaining a provisioning token from a remote database with the existing household appliance and securely transmitting network credentials for the wireless network and the provisioning token from the existing household appliance to the new household appliance via the direct connection. The method then includes connecting, by the new household appliance, to the wireless network using the securely transmitted network credentials and associating the new appliance with the user account using the securely transmitted provisioning token.

In accordance with another embodiment of the present disclosure, a method of provisioning a household appliance is provided. The method includes receiving, from a user interface of a first household appliance, a request to add a second household appliance to a user account. The first household appliance is connected to a wireless network and provisioned to the user account. The method also includes initiating a connection mode on the first household appliance in response to receiving the request to add the second household appliance and providing an instruction on the user interface of the first household appliance to press a provisioning button on the second household appliance. The method further includes searching for the first household appliance, by the second household appliance, in response to receiving an input from the provisioning button on the second household appliance. The method also includes receiving a start command from the user interface of the first household appliance. The method then includes establishing a direct connection between the first household appliance and the second household appliance after receiving the start command from the user interface of the first household appliance. The method further includes transmitting a request from the first household appliance to a remote database for a provisioning token associated with the user account for the second household appliance and receiving the provisioning token based on the user account from the remote database with the first household appliance. The method then includes securely transmitting network credentials for the wireless network and the provisioning token from the first household appliance to the second household appliance over the direct connection. The method also includes connecting the second household appliance to the wireless network using the securely transmitted network credentials and associating the second appliance with the user account using the securely transmitted provisioning token.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
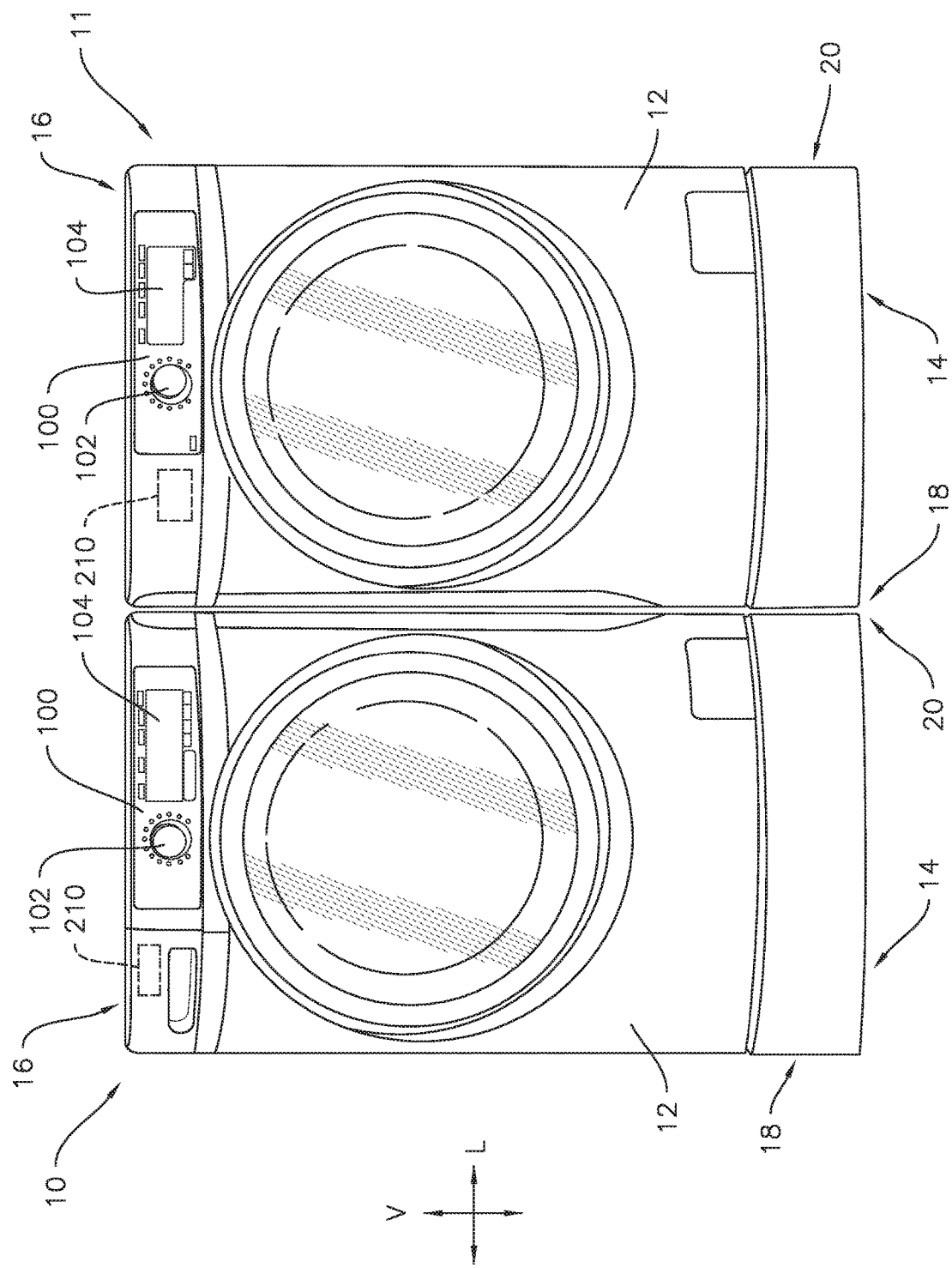
FIG. 1 provides a front view of exemplary laundry appliances in accordance with one or more example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
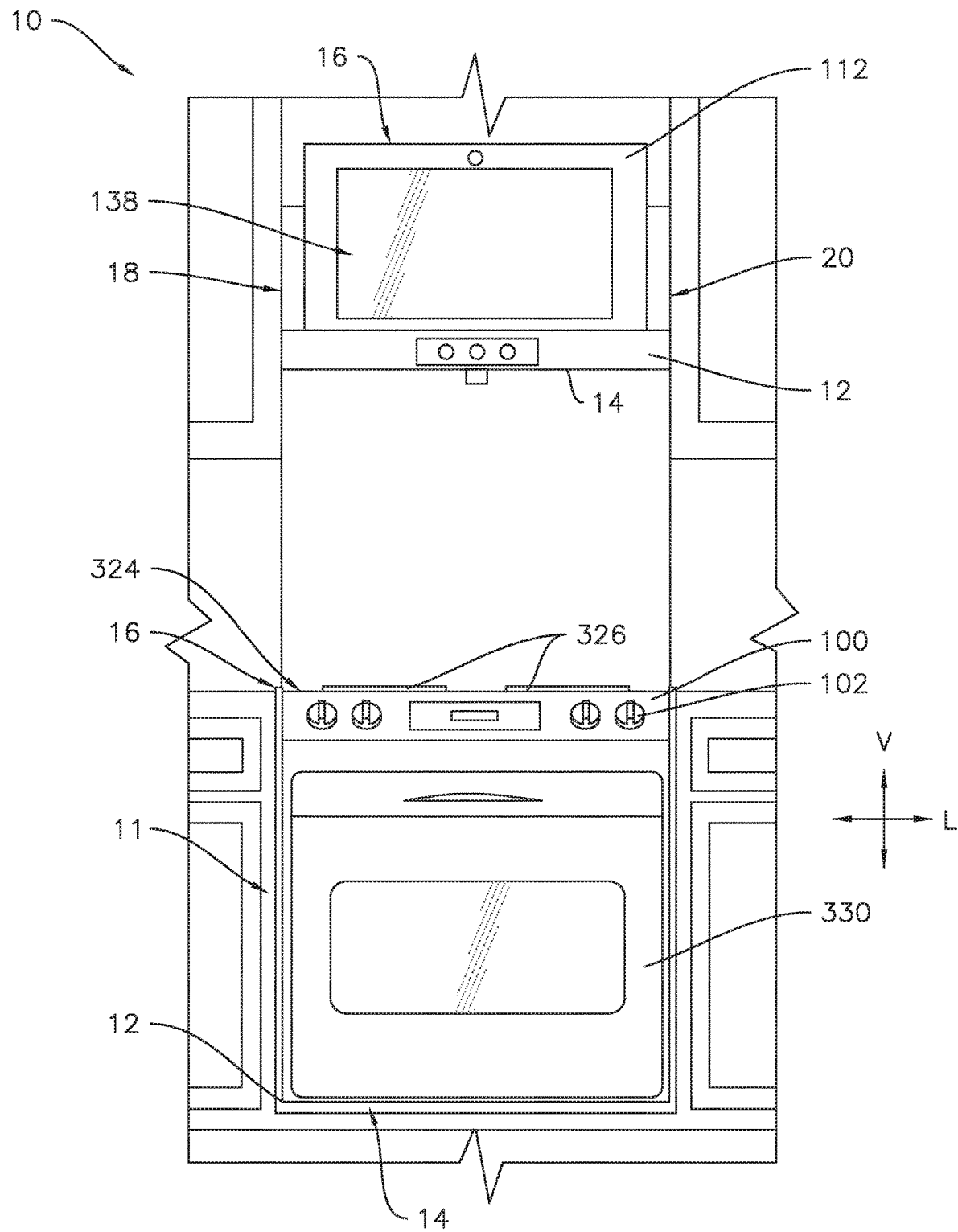
FIG. 2 provides a front view of an exemplary group of kitchen appliances in accordance with additional example embodiments of the present disclosure.

As may be seen in FIGS. 1 and 2, in accordance with one or more embodiments of the present subject matter, a group of appliances including at least a first appliance 10 and a second appliance 11 is provided. The illustrated group of two appliances is provided by way of example only. Various embodiments of the present subject matter may also include three or more appliances, wherein one appliance of the group of three of more appliances transmits and receives wireless signals and relays signals to the remaining two or more appliances of the group for commissioning the remaining two or more appliances.

As generally seen throughout FIGS. 1 and 2, each appliance 10 and 11 includes a cabinet 12 which defines a vertical direction V and a lateral direction L that are mutually perpendicular. Each cabinet 12 extends between a top side 16 and a bottom side 14 along the vertical direction V. Each cabinet 12 also extends between a left side 18 and a right side 20, e.g., along the lateral direction L.

Each appliance 10 and 11 may include a user interface panel 100 and a user input device 102 which may be positioned on an exterior of the cabinet 12. The user input device 102 is generally positioned proximate to the user interface panel 100, and in some embodiments, the user input device 102 may be positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be the user input device 102.

Generally, each appliance 10 and 11 may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliances 10 and 11. Operation of the appliances 10 and 11 may each be regulated by the respective controller 210 that is operatively coupled to the corresponding user interface panel 100. A user interface panel 100 may for example provide selections for user manipulation of the operation of an appliance, e.g., via user input device 102 and/or display 104. In response to user manipulation of the user interface panel 100 and/or user input device 102, the controller 210 may operate various components of the appliance 10 or 11. Each controller 210 may include a memory and one or more microprocessors, CPUs or the like, such as general or special purpose microprocessors operable to execute programming instructions or micro-control code associated with operation of the appliance 10 or 11. The memory may represent random access memory such as DRAM, or read only memory such as ROM or FLASH. In one embodiment, the processor executes programming instructions stored in memory. The memory may be a separate component from the processor or may be included onboard within the processor. Alternatively, a controller 210 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 210 may be programmed to operate the respective appliance 10 or 11 by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions and/or instructions (e.g. performing the methods, steps, calculations and the like and storing relevant data as disclosed herein). It should be noted that controllers 210 as disclosed herein are capable of and may be operable to perform any methods and associated method steps as disclosed herein.

In some embodiments, for example, as illustrated in FIG. 1, the group of appliances 10 and 11 may be a pair of laundry appliances. In the exemplary embodiment illustrated in FIG. 1, the first appliance may be a washing machine appliance 10 and the second appliance may be a clothes dryer 11. In other embodiments, the washing machine appliance may be the second appliance and the clothes dryer may be the first appliance. In embodiments such as illustrated in FIG. 1, the user input device 102 of each appliance 10 and 11 may be positioned on the user interface panel 100. The embodiment illustrated in FIG. 1 also includes a display 104 on the user interface panel.

FIG. 2 illustrates another example embodiment of a group of appliance where the first appliance 10 and the second appliance 11 are kitchen appliances. In this example, the first appliance 10 is a microwave oven that is generally positioned above a cooktop appliance 11, e.g., along the vertical direction V.

Microwave oven appliance 10 includes a cabinet 12. A cooking chamber is defined within the cabinet 12 of the microwave 10. The cooking chamber is accessible via a door 112 and viewable through a window 138 in the door 112. Microwave 10 is configured to heat articles, e.g., food or beverages, within the cooking chamber using electromagnetic radiation. Microwave appliance 10 may include various components which operate to produce the electromagnetic radiation, as is generally understood. For example, microwave appliance 10 may include a magnetron (such as, for example, a cavity magnetron), a high voltage transformer, a high voltage capacitor and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to the cooking chamber. The structure and intended function of microwave ovens are generally understood by those of ordinary skill in the art and are not described in further detail herein.

As shown, cooktop appliance 11 includes a chassis or cabinet 12 that extends along the vertical direction V between a top side 16 and a bottom side 14. Cooktop appliance 11 can include a cooktop surface 324 having one or more heating elements 326 for use in, for example, heating or cooking operations. In one example embodiment, cooktop surface 324 is constructed with ceramic glass. In other embodiments, however, cooktop surface 324 may include any another suitable material, such as a metallic material (e.g., steel) or another suitable non-metallic material. Heating elements 326 may be various sizes and may employ any suitable method for heating or cooking an object, such as a cooking utensil (not shown), and its contents. In one embodiment, for example, heating element 326 uses a heat transfer method, such as electric coils or gas burners, to heat the cooking utensil. In another embodiment, however, heating element 326 uses an induction heating method to heat the cooking utensil directly. In various embodiments, the heating elements 326 may include one or more of a gas burner element, resistive heat element, radiant heat element, induction element, or another suitable heating element.

In some embodiments, the cabinet 12 of the cooktop appliance 11 may be insulated and may define a cooking chamber selectively enclosed by a door 330. One or more heating elements (e.g., top broiling elements or bottom baking elements) may be positioned within cabinet 12 of cooktop appliance 11 to heat cooking chamber. Heating elements within cooking chamber may be provided as any suitable element for cooking the contents of cooking chamber, such as an electric resistive heating element, a gas burner, a microwave element, a halogen element, etc. Thus, cooktop appliance 11 may be referred to as an oven range appliance. As will be understood by those skilled in the art, cooktop appliance 11 is provided by way of example only, and the present subject matter may be used in the context of any suitable cooking appliance, such as a double oven range appliance or a standalone cooktop (e.g., fitted integrally with a surface of a kitchen counter). Thus, the example embodiments illustrated and described are not intended to limit the present subject matter to any particular cooking chamber or heating element configuration, unless explicitly indicated as being limited.

As illustrated, a user interface panel 100 may be provided on cooktop appliance 11. Although shown at front portion of cooktop appliance 11, another suitable location or structure (e.g., a backsplash) for supporting user interface panel 100 may be provided in alternative embodiments. In some embodiments, user interface panel 100 includes input devices or controls 102, such as one or more of a variety of electrical, mechanical, or electro-mechanical input devices. User input devices 102 may include, for example, rotary dials, knobs, push buttons, and touch pads. A controller 210 is in communication with user interface panel 100 and user input devices 102 through which a user may select various operational features and modes and monitor progress of cooktop appliance 11. In additional or alternative embodiments, user interface panel 100 includes a display component, such as a digital or analog display in communication with a controller 210 and configured to provide operational feedback to a user. In certain embodiments, user interface panel 100 represents a general purpose I/O ("GPIO") device or functional block.

As shown, controller 210 is communicatively coupled (i.e., in operative communication) with user interface panel 100 and its user input devices 102. Controller 210 may also be communicatively coupled with various operational components of cooktop appliance 300 as well, such as heating elements (e.g., 326, 332), sensors, and the like. Input/output ("I/O") signals may be routed between controller 210 and the various operational components of cooktop appliance 11. Thus, controller 210 can selectively activate and operate these various components. Various components of cooktop appliance 11 are communicatively coupled with controller 210 via one or more communication lines such as, for example, conductive signal lines, shared communication busses, or wireless communications bands.

According to various embodiments of the present disclosure, the appliances 10 and 11 may take the form of any of the examples described above, or may be any other household appliance where improved ease of commissioning the appliance is desired. Thus, it will be understood that the present subject matter is not limited to any particular household appliance. Further, the group of appliances need not necessarily be related or located in the same room as one another. For instance, while the first and second appliances 10 and 11 are both laundry appliances in the example illustrated in FIG. 1 and are both kitchen appliances in the example illustrated in FIG. 2, the group of appliances can include any two or more appliances which are within communication range, e.g., within WI-FI® range, of each other. Thus, in just one possible example, the first appliance 10 could be a refrigerator appliance, and the second appliance 11 could be any of the other example appliances described herein, such as the washer and/or dryer of FIG. 1, as well as any other household appliance.

It should be understood that "household appliances" and/or "appliances" are used herein to describe appliances typically used or intended for common domestic tasks, such as laundry appliances or kitchen appliances, e.g., as illustrated in FIGS. 1 and 2, or air conditioners, dishwashing appliances, water heaters, etc., and any other household appliance which performs similar functions in addition to network communication and data processing. Thus, devices such as a personal computer, router, and other similar devices whose primary functions are network communication and/or data processing are not considered household appliances as used herein.

Figure 3:
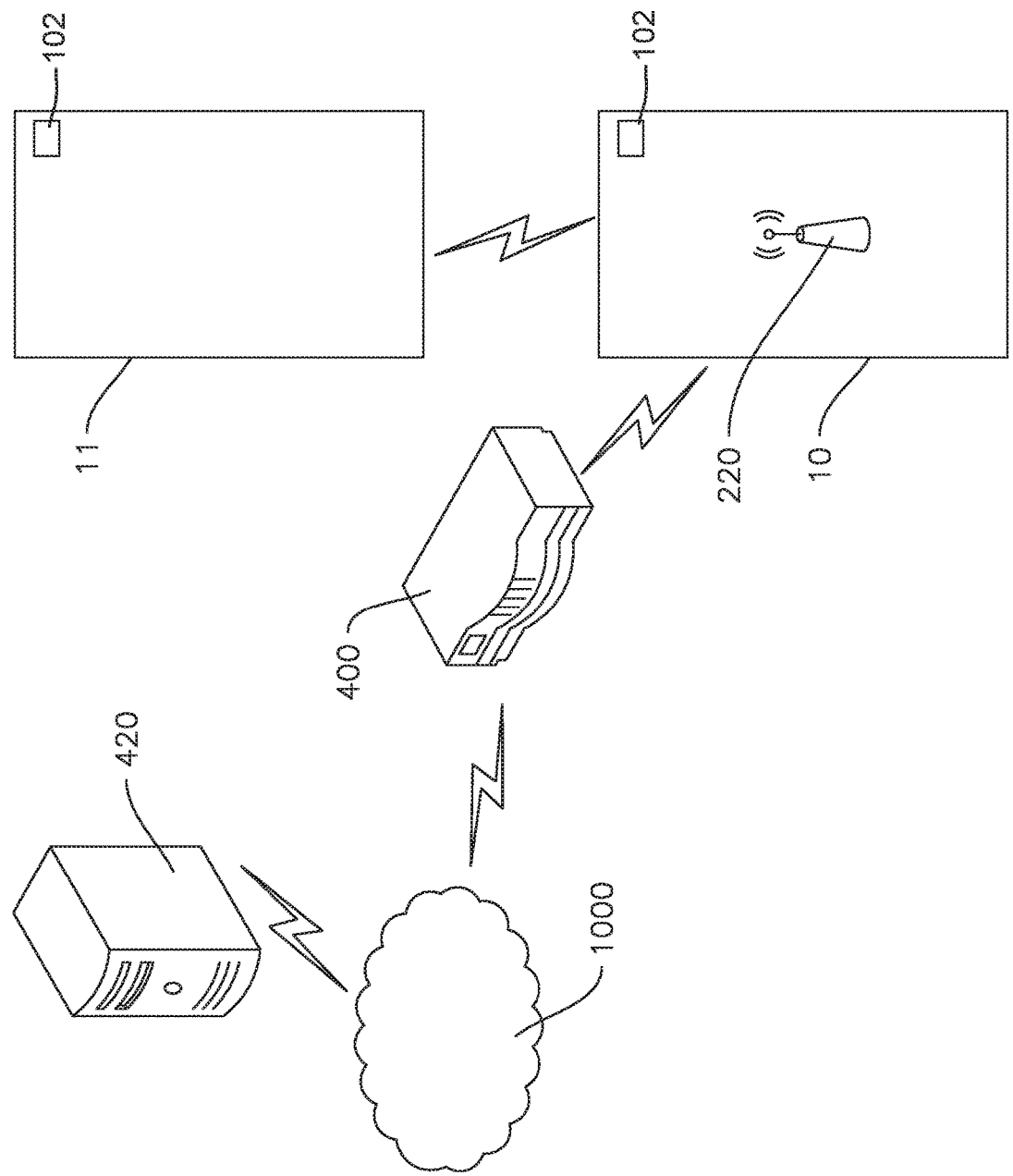
FIG. 3 provides a schematic view of a new appliance directly connected to an existing appliance in accordance with one or more example embodiments of the present disclosure.
Figure 4:
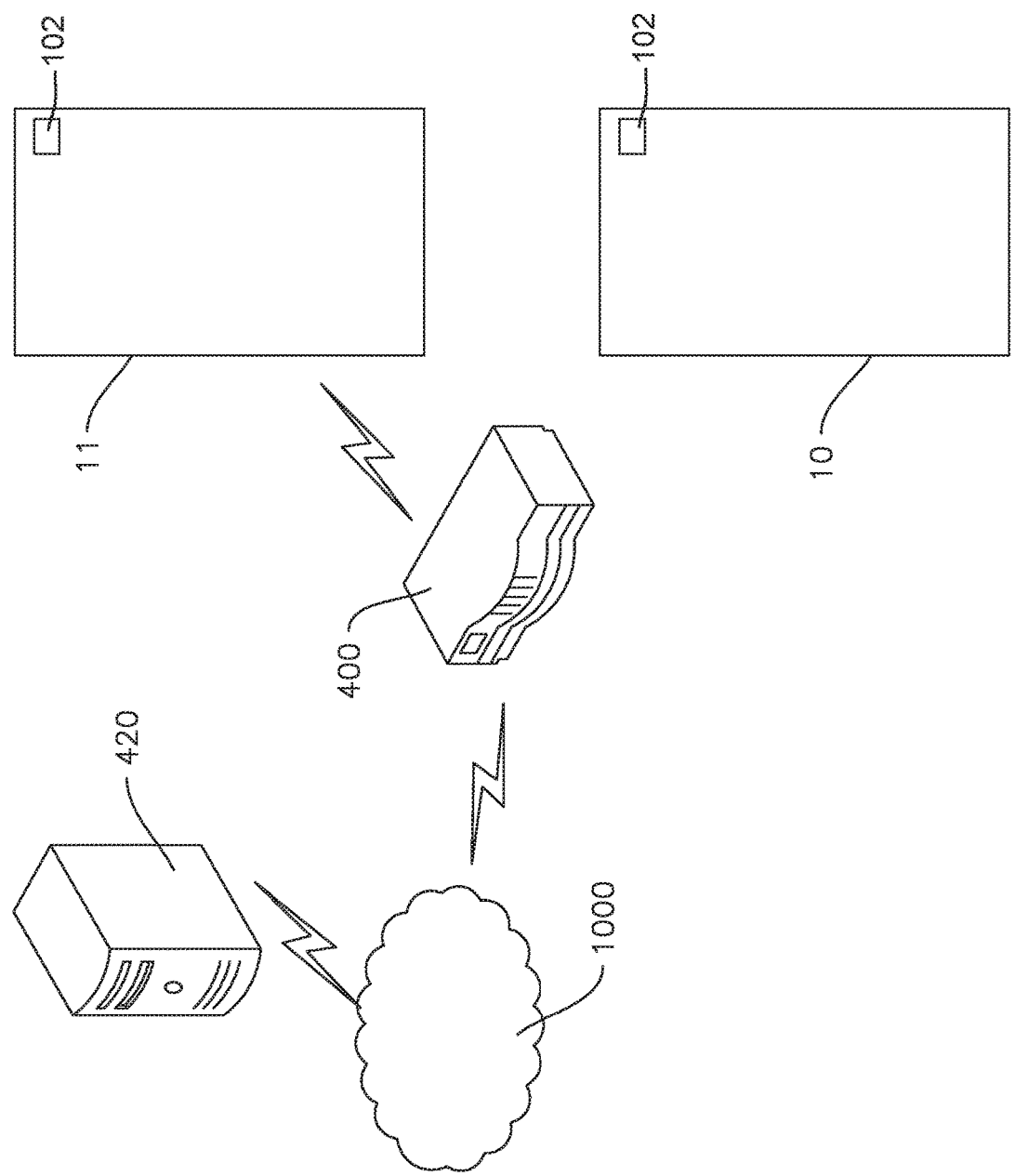
FIG. 4 provides a schematic view of the new appliance of FIG. 3 connected to a wireless network after provisioning the new appliance via the direct connection with the existing appliance.

Turning now generally to FIGS. 3 and 4, the household appliances 10 and 11, and in particular, controllers 210 thereof, may be configured to communicate with each other, e.g., in at least some embodiments, the household appliances 10 and 11 may connect directly and communicate directly. The household appliances 10 and 11 may also connect to and communicate with a remote server or database 420, e.g., via a network such as the internet 1000. The household appliances 10 and 11 may access the internet 1000 via an access point such as a modem or router 400, which may be a part of a WI-FI® network, e.g., in a user's home.

The household appliances 10 and/or 11 may be in communication with each other and the remote database 420 through various possible communication connections and interfaces, such as but not limited to Zigbee, BLUETOOTH®, WI-FI®, or any other suitable communication connection.

Methods and systems according to the present disclosure advantageously provide a smoother and more convenient user experience when commissioning or provisioning a new household appliance 11. For example, provisioning the appliance 11 may include connecting the appliance(s) to a WI-FI® network for the first time and/or adding the appliance or appliances to a user account on the remote database 420.

FIG. 3 provides a schematic view of the new household appliance or second household appliance 11 directly connected to the existing household appliance or first household appliance 10. Thus, the second household appliance 11 may be a new household appliance 11 and the first household appliance 10 may be an existing or already-provisioned appliance 10 which is already logged into and connected to the home wireless network (e.g., via router 400) and provisioned to a user account on the remote database 420. As shown, in FIG. 3, the new appliance 11 may connect to the existing household appliance 10 via a soft access point (soft AP) 220 provided on the first household appliance 10.

In some embodiments, provisioning of the new appliance 11 may be initiated by requesting to add the new appliance 11 to a user account and by manipulating a user input 102, e.g., pressing a button, on the new appliance 11. For example, a method of commissioning the new household appliance 11 may include receiving a request to add the new appliance 11 to a user account on the user interface 102 of the existing household appliance 10. For example, a user may initiate the request to add the new household appliance 11 to the user's account via a touchscreen on the existing household appliance 10. The request to add the new household appliance 11 to the user account may be transmitted from the existing household appliance 10 to the database 420 via the network 1000, e.g., the internet or a cellular data network, etc. When the database 420 receives the request to add the new appliance 11, the database 420 may then send a provisioning token for the new household appliance 11 to the existing, previously commissioned household appliance 10.

The example method of commissioning the new household appliance 11 may further include receiving a signal from a user input 102 on the new household appliance 11, such as a signal generated in response to the user pressing a button or touchscreen or, as another example input, issuing a verbal command to a voice-enabled appliance. The new appliance 11 may then scan for the existing household appliance 10 in response to receiving the signal from the user input 102. The new appliance 11 may then connect directly to the existing household appliance 10, e.g., the soft AP 220, and/or the direct connection may be established or completed in response to an input such as a start command received on the existing household appliance 10.

The existing household appliance 10 may transmit a request to the remote database 420 for a provisioning token associated with the user account. Such provisioning token may be used for the new household appliance 11.

The new appliance 11 may establish a secure connection, such as a transport layer security (TLS) connection, to the existing appliance 10, e.g., the soft AP 220 thereon. The new appliance 11 may then receive network credentials, such as an SSID and password, for the wireless network and the provisioning token for the user account from the existing appliance 10 over the secure connection.

The provisioning token may be sent from the remote database 420 to the new household appliance 11 via the soft AP 220. For example, the database 420 may send the provisioning token to the device providing the soft AP 220, e.g., the existing appliance 10. The existing appliance 10 may then relay the provisioning token along with a network credential, e.g., a password for the user's home router 400, to the new appliance 11.

After receiving the network credential, the new appliance 11 may disconnect from the soft AP 220 and connect directly to the network, e.g., may connect directly to the user's home WI-FI® network via the router 400, as illustrated for example in FIG. 4. Once connected directly to the router 400, the new appliance 11 may then connect to the remote database 420 via the router 400 and may connect using the provisioning token. The database 420 may then associate the new appliance 11 with the user account and/or provision the new appliance 11 to the user account. The database 420 may also, in some embodiments, send a command to disable the soft AP 220 to the device providing the soft AP 220, e.g., the existing appliance 10, after the appliance 11 connects to the database 420 using the provisioning token.

Figure 5:
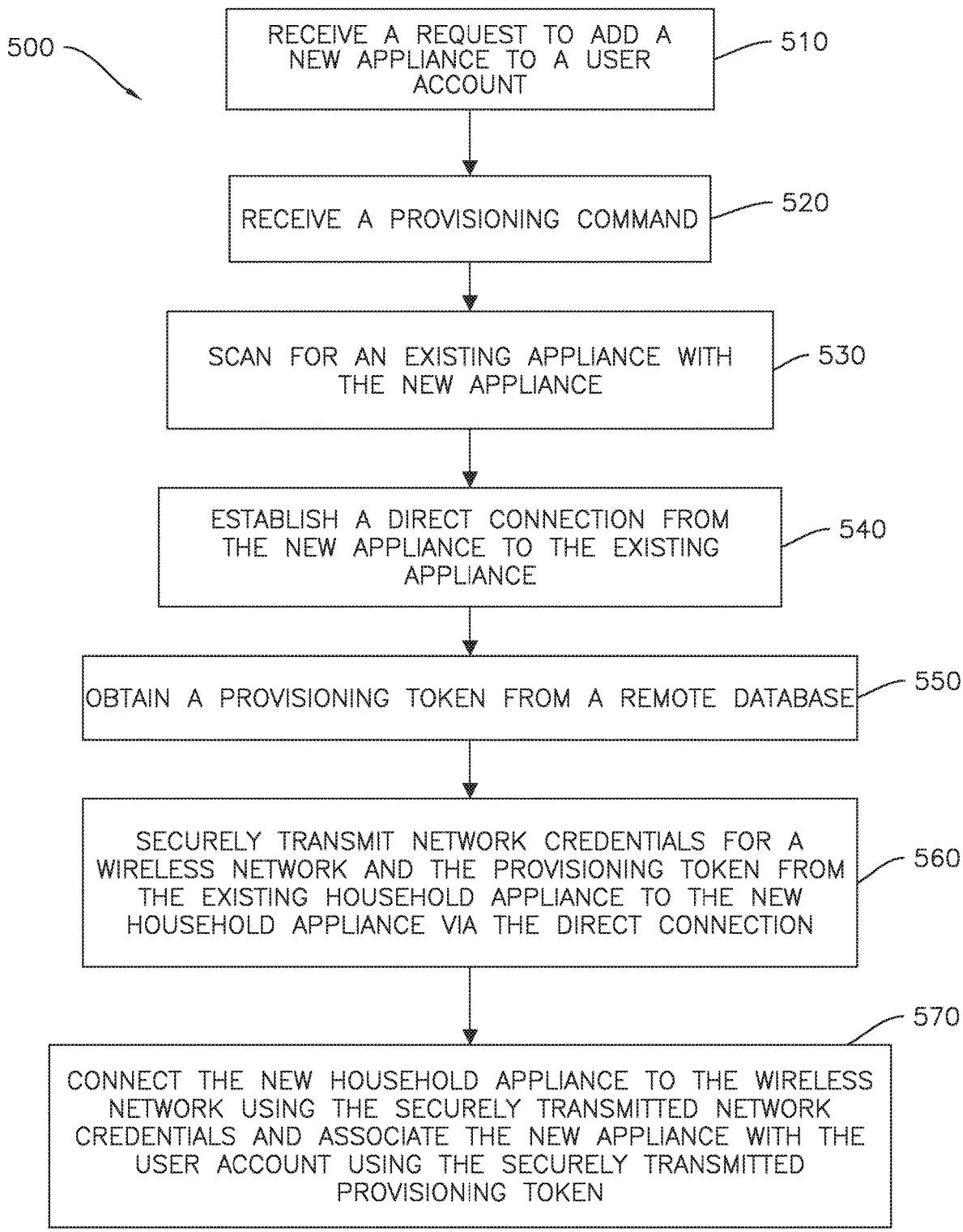
FIG. 5 provides a flowchart illustrating an example method of provisioning a household appliance according to one or more example embodiments of the present disclosure.

Exemplary methods according to the present subject matter include the method 500 illustrated in FIG. 5. As illustrated in FIG. 5, in some embodiments, an example method 500 of provisioning a new household appliance, such as the example household appliance 11, may be performed using an existing household appliance, such as the example household appliance 10. In some embodiments, the existing household appliance may be connected to a wireless network and provisioned to a user account. In some embodiments, the method 500 may include a step 510 of receiving a request to add the new household appliance to the user account. The request may be received, e.g., on a user interface of the existing household appliance, such as the user interface panel 100 of the household appliance 10 or an input on the panel 100. For example, the step 510, as well as other receiving steps described herein, may be performed in response to a user input and/or a signal generated by the user input, such as the user input 102 described hereinabove in various example embodiments.

In some embodiments, the method 500 may also include a step 520 of receiving a provisioning command from a user interface of the new household appliance. For example, the method 500 may include providing a user instruction on the user interface of the existing household appliance to press a provisioning button. In such embodiments, the user interface of the new household appliance from which the provisioning command is received may be or include the provisioning button. The provisioning button, as well as each other user input described herein, may, in various embodiments, be provided as a physical button, such as a push button or a touch pad button, or as a virtual button, such as a soft key or a selection on an interactive menu provided via a touchscreen interface, among other possible examples of a button.

In some embodiments, the new household appliance scans for the existing household appliance at step 530. For example, the new household appliance may scan for the existing household appliance in response to the provisioning command. The new household appliance generally scans for the existing household appliance for a short period of time, such as about five minutes or less, e.g., about one minute to about five minutes, such as about thirty seconds to about four minutes, such as about three and a half minutes or less, such as about two minutes or less, such as about ninety seconds or less, such as about one minute or less.

The method 500 may, in some embodiments, further include a step 540 of establishing a direct connection from the new household appliance to the existing household appliance. For example, the direct connection may be initiated by the existing household appliance when the existing household receives the request at step 510, and the new household appliance may connect to the existing household appliance after scanning for the existing household appliance. In some embodiments, the secure connection may be completed by the existing appliance, e.g., in response to receiving a start command from the user interface of the existing household appliance. For example, the secure connection may include WI-FI® Protected Setup (WPS), a transport layer security (TLS) connection, and/or any other suitable connection protocols or methods which provide a secure connection between the new household appliance and the existing household appliance. In various embodiments, the direct connection from the new household appliance to the existing household appliance is a peer-to-peer connection, such as a WIFI® Direct connection, or establishing the direct connection from the new household appliance to the existing household appliance may include connecting the new household appliance to the existing household appliance as a client.

In some embodiments, the method 500 may also include obtaining a provisioning token from a remote database with the existing household appliance, e.g., as illustrated at step 550 in FIG. 5. The existing household appliance may, after receiving the provisioning token, e.g., as illustrated at step 560, securely transmit network credentials for the wireless network and the provisioning token from the existing household appliance to the new household appliance via the direct connection.

The method 500, in at least some embodiments, may then include connecting the new household appliance to the wireless network using the securely transmitted network credentials and associating the new appliance with the user account using the securely transmitted provisioning token. For example, as noted at 570 in FIG. 5, the new household appliance may use the received credentials and token to connect to the wireless network and associate with or provision to the user account.

In some embodiments, the method 500 may also include initiating a connection mode on the existing appliance in response to the request to add the new appliance. The connection mode may include providing a soft AP on the existing appliance and/or a peer-to-peer (P2P) mode interface on the existing appliance. In such embodiments, the method 500 may further include terminating the connection mode on the existing household appliance after connecting the new household appliance to the wireless network and associating the new household appliance with the user account.

The exemplary methods described herein provide numerous advantages. For example, the method 500 may not require or include connecting to either the existing household appliance or the new household appliance with a remote user interface device. Rather, the new household appliance may be provisioned solely through the direct connection between the existing household appliance and the new household appliance, without any intermediate devices or interfaces. For example, the method may not require or include remote user interface devices such as a laptop computer, smartphone, tablet, personal computer, wearable device, and/or a smart home system.

Figure 6:
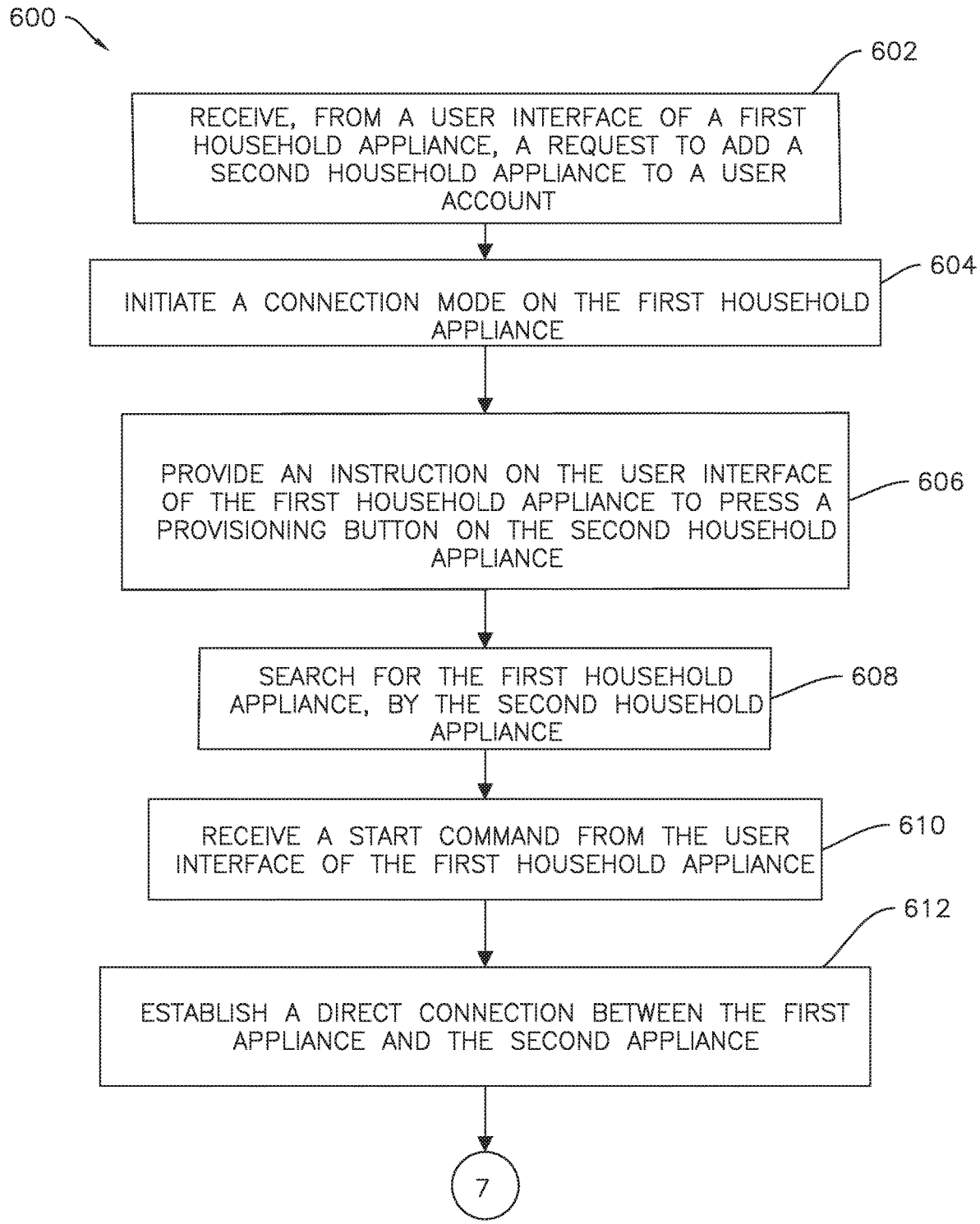
FIGS. 6 and 7 provides a flowchart illustrating another example method of commissioning a household appliance according to one or more additional example embodiments of the present disclosure.
Figure 7:
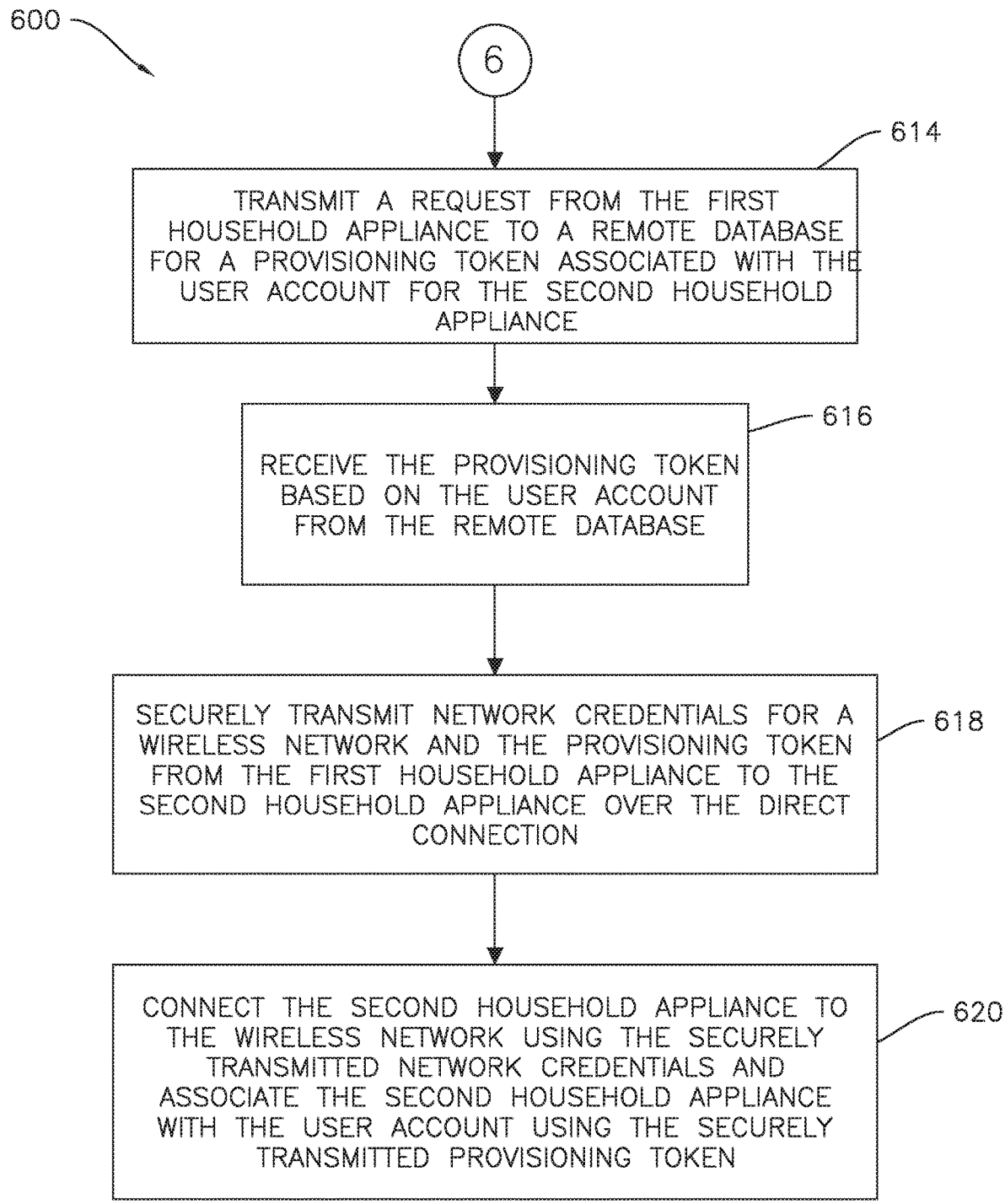

Exemplary methods according to the present subject matter include the method 600 illustrated in FIGS. 6 and 7. As illustrated in FIG. 6, in some embodiments, an example method 600 of provisioning a household appliance, such as the example household appliance 11, may include a step 602 of receiving, from a user interface of a first household appliance, a request to add a second household appliance to a user account. The first household appliance may be connected to a wireless network and provisioned to the user account.

The method may then include a step 604 of initiating a connection mode on the first household appliance in response to receiving the request to add the second household appliance. As mentioned above, the first appliance may be already connected to the wireless network. For example, the wireless network may be a WI-FI® network, such as in a residential setting. The first appliance may be connected to such network via a router, and may be connected to the router as a client, e.g., in station mode. In some embodiments, the first household appliance may be connected to the wireless network in client mode before and during the step of initiating the connection mode on the first household appliance. In various embodiments, initiating the connection mode on the first household appliance may include providing a soft access point on the first household appliance and/or initiating a peer-to-peer connection mode.

In some embodiments, the method 600 may include a step 606 of providing an instruction on the user interface of the first household appliance to press a provisioning button on the second household appliance. In response to receiving an input from the provisioning button on the second household appliance, such as a signal generated by the provisioning button in response a user pressing the provisioning button, the second appliance may search or scan for the first household appliance, e.g., as illustrated at 608 in FIG. 6. The second household appliance generally searches for the first household appliance for a short period of time, such as about five minutes or less, e.g., about one minute to about five minutes, such as about thirty seconds to about four minutes, such as about three and a half minutes or less, such as about two minutes or less, such as about ninety seconds or less, such as about one minute or less.

In some embodiments, while the second appliance is searching, a start command may be received from the user interface of the first household appliance, e.g., as illustrated at 610 in FIG. 6. After receiving the start command, the method 600 may include establishing a direct connection between the first household appliance and the second household appliance at 612. In various embodiments, the secure connection may include WI-FI® Protected Setup (WPS), a transport layer security (TLS) connection, and/or any other suitable connection protocols or methods which provide a secure connection between the first household appliance and the second household appliance. In various embodiments, the direct connection may be a peer-to-peer connection, such as a WIFI® Direct connection, or establishing the direct connection between the first household appliance and the second household appliance may include connecting the second household appliance to the first household appliance as a client.

Turning now to FIG. 7, in some embodiments, the method 600 may further include a step 614 of transmitting a request from the first household appliance to a remote database for a provisioning token associated with the user account for the second household appliance. Method 600 may further include a step 616 of receiving the provisioning token based on the user account from the remote database with the first household appliance.

In some embodiments, method 600 may also include securely transmitting network credentials for the wireless network and the provisioning token from the first household appliance to the second household appliance over the direct connection, e.g., as illustrated at step 618 in FIG. 7. The network credentials and provisioning token may then be used in a step 620 of connecting the second household appliance to the wireless network using the securely transmitted network credentials and associating the second appliance with the user account using the securely transmitted provisioning token.

In some embodiments, the method 600 may further include terminating the connection mode on the first household appliance after connecting the second household appliance to the wireless network and associating the second household appliance with the user account.

As mentioned above, advantages of the present methods include (but are not limited to) a more streamlined user experience for provisioning a new appliance (second appliance) to a user account over the direct connection between the household appliances. Thus, for example, the method 600 may not require or include connecting to a remote user interface device (such as a smartphone, smart watch, etc., as noted above) by either the first household appliance or the second household appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of provisioning a new household appliance using an existing household appliance, the existing household appliance connected to a wireless network and provisioned to a user account, the method comprising:
   receiving, from a user interface of the existing household appliance, a request to add the new household appliance to the user account;
   receiving a provisioning command from a user interface of the new household appliance;
   scanning for the existing household appliance with the new household appliance;
   establishing a direct connection from the new household appliance to the existing household appliance;
   obtaining a provisioning token from a remote database with the existing household appliance;
   securely transmitting network credentials for the wireless network and the provisioning token from the existing household appliance to the new household appliance via the direct connection; and
   connecting, by the new household appliance, to the wireless network using the securely transmitted network credentials and associating the new appliance with the user account using the securely transmitted provisioning token.

2. The method of claim 1, wherein the step of scanning with the new household appliance for the existing appliance is performed in response to the provisioning command.

3. The method of claim 1, wherein the step of scanning with the new household appliance for the existing appliance is performed for two minutes or less.

4. The method of claim 1, further comprising providing a user instruction on the user interface of the existing household appliance to press a provisioning button, and wherein the user interface of the new household appliance from which the provisioning command is received comprises the provisioning button.

5. The method of claim 1, further comprising receiving a start command from the user interface of the existing household appliance to complete the direct connection from the new household appliance to the existing household appliance.

6. The method of claim 1, wherein the direct connection from the new household appliance to the existing household appliance is a peer-to-peer connection.

7. The method of claim 1, wherein establishing the direct connection from the new household appliance to the existing household appliance comprises connecting the new household appliance to the existing household appliance as a client.

8. The method of claim 1, wherein the method does not include connecting to either the existing household appliance or the new household appliance with a remote user interface device.

9. The method of claim 1, further comprising initiating a connection mode on the existing appliance in response to the request to add the new appliance and terminating the connection mode on the existing household appliance after connecting the new household appliance to the wireless network and associating the new household appliance with the user account.

10. The method of claim 1, wherein the user interface of the existing household appliance comprises a touch screen.

11. A method of provisioning a household appliance, the method comprising:
   receiving, from a user interface of a first household appliance, a request to add a second household appliance to a user account, wherein the first household appliance is connected to a wireless network and provisioned to the user account;
   initiating a connection mode on the first household appliance in response to receiving the request to add the second household appliance;
   providing an instruction on the user interface of the first household appliance to press a provisioning button on the second household appliance;
   searching for the first household appliance, by the second household appliance, in response to receiving an input from the provisioning button on the second household appliance;
   establishing a direct connection between the first household appliance and the second household appliance;
   transmitting a request from the first household appliance to a remote database for a provisioning token associated with the user account for the second household appliance;
   receiving the provisioning token based on the user account from the remote database with the first household appliance;
   securely transmitting network credentials for the wireless network and the provisioning token from the first household appliance to the second household appliance over the direct connection; and connecting the second household appliance to the wireless network using the securely transmitted network credentials and associating the second appliance with the user account using the securely transmitted provisioning token.

12. The method of claim 11, wherein the first appliance is connected to the wireless network in client mode before and during the step of initiating the connection mode on the first household appliance.

13. The method of claim 11, wherein initiating the connection mode on the first household appliance comprises providing a soft access point on the first household appliance.

14. The method of claim 11, wherein initiating the connection mode on the first household appliance comprises initiating a peer-to-peer connection mode.

15. The method of claim 11, wherein the step of searching for the first household appliance by the second household appliance is performed for two minutes or less.

16. The method of claim 11, wherein the direct connection between the first household appliance and the second household appliance is a wireless protected setup connection.

17. The method of claim 11, further comprising terminating the connection mode on the first household appliance after connecting the second household appliance to the wireless network and associating the second household appliance with the user account.

18. The method of claim 11, wherein the method does not include connecting to a remote user interface device by either the first household appliance or the second household appliance.

19. The method of claim 11, further comprising receiving a start command from the user interface of the first household appliance, and wherein the step of establishing a direct connection between the first household appliance and the second household appliance is performed after receiving the start command from the user interface of the first household appliance.

* * * * *